(12) United States Patent
Fiordilino et al.

(10) Patent No.: US 11,258,377 B2
(45) Date of Patent: Feb. 22, 2022

(54) PERTURBATION MEASUREMENT, CORRECTION, AND INDUCING SYSTEM ADAPTED TO PROVIDE HIGHLY ACCURATE PERTURBATION MEASUREMENTS AND REDUCE THE EFFECTS OF PERTURBATIONS WITHIN THE SYSTEM

(71) Applicant: The United States of America, as represented by the Secretary of the Navy, Crane, IN (US)

(72) Inventors: Joseph A. Fiordilino, Pittsburgh, PA (US); Subrata Sanyal, Eastvale, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 752 days.

(21) Appl. No.: 16/135,064

(22) Filed: Sep. 19, 2018

(65) Prior Publication Data

US 2019/0103820 A1 Apr. 4, 2019

Related U.S. Application Data

(60) Provisional application No. 62/560,507, filed on Sep. 19, 2017.

(51) Int. Cl.
*H02N 2/00* (2006.01)
*G01P 15/097* (2006.01)
*H02N 2/18* (2006.01)
*F16F 15/00* (2006.01)
*G01M 7/00* (2006.01)

*G02B 7/00* (2021.01)
*G02B 27/64* (2006.01)
(Continued)

(52) U.S. Cl.
CPC ......... *H02N 2/0075* (2013.01); *F16F 15/005* (2013.01); *G01M 7/00* (2013.01); *G01P 15/097* (2013.01); *G02B 7/008* (2013.01); *G02B 27/646* (2013.01); *H02N 2/005* (2013.01); *H02N 2/181* (2013.01); *H04N 1/047* (2013.01); *G01P 15/00* (2013.01)

(58) Field of Classification Search
CPC ...... H02N 2/0075; H02N 2/005; H02N 2/181; G02B 7/008; G02B 27/646; G01M 7/00; G01P 15/097; G01P 15/00; F16F 15/005; H04N 1/047
See application file for complete search history.

(56) References Cited

U.S. PATENT DOCUMENTS 7,064,908 B2    6/2006  Cipra
11,077,526 B2 *  8/2021  Kleinert ............... B23K 26/703
(Continued)

*Primary Examiner* — Emily P Pham
(74) *Attorney, Agent, or Firm* — Naval Surface Warfare Center, Crane Division; Eric VanWiltenburg

(57) ABSTRACT

The present invention relates to a device which can measure, induce, and correct perturbations acting on an electromagnetic (EM) propagation source. Piezoelectric transducers are used to measure and control perturbations within a system to improve operation of an EM source. Perturbation measurements can be used to determine the environmental and system impacts on the EM source. Moreover, measurements can be used to correct or nullify perturbations applied to the EM source, through active or passive means.

14 Claims, 7 Drawing Sheets

(51) Int. Cl.
  *H04N 1/047* (2006.01)
  *G01P 15/00* (2006.01)

(56) References Cited

U.S. PATENT DOCUMENTS

2002/0145102 A1  10/2002  Eckelkamp-Baker
2011/0049328 A1   3/2011  Vaillon

* cited by examiner

PERTURBATION MEASUREMENT, CORRECTION, AND INDUCING SYSTEM ADAPTED TO PROVIDE HIGHLY ACCURATE PERTURBATION MEASUREMENTS AND REDUCE THE EFFECTS OF PERTURBATIONS WITHIN THE SYSTEM

CROSS-REFERENCE TO RELATED APPLICATIONS

The present application claims priority to U.S. Provisional Patent Application Ser. No. 62/560,507, filed Sep. 19, 2017, entitled "A PERTURBATION MEASUREMENT, CORRECTION, AND INDUCING SYSTEM ADAPTED TO PROVIDE HIGHLY ACCURATE PERTURBATION MEASUREMENTS AND REDUCE THE EFFECTS OF PERTURBATIONS WITHIN THE SYSTEM," the disclosure of which is expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 200,461) is assigned to the United States Government and is available for licensing for commercial purposes. Licensing and technical inquiries may be directed to the Technology Transfer Office, Naval Surface Warfare Center Corona Division, email: CRNA_CTO@navy.mil.

BACKGROUND AND SUMMARY OF THE INVENTION

The present invention relates to a device/enclosure which can measure, induce, and correct physical perturbations (e.g., vibrations, etc.) acting on an electromagnetic (EM) propagation source inside the enclosure. Perturbations that act on an EM propagator act to diminish its effectiveness at a distant target/detector. For example, for high energy laser (HEL) propagation in the atmosphere, jitter (perturbations) can cause beam spreading that acts to reduce the power on target. The effect of jitter on the laser beam characteristics increases with the beam propagation distance. Consequently, there is a need to understand and characterize the environmental and internal jitter on a HEL beam propagator and to actively correct it, as much as possible, in an operational environment.

Many devices which detect and correct perturbations to an EM beam use an array of lenses, mirrors, and crystals (patent #US 2002/0145102 A1, US 2011/0049328 A1). A HEL beam impinging on a lens or partially reflective mirror can act to heat up the lens or mirror. Given sufficient laser power and time, these lenses and mirrors will warp or melt, reducing the efficacy of the array that makes the bulk of such inventions; it is no wonder that such devices are often constructed with low power laser diodes in mind. Furthermore, such systems may not be amenable, in their current states, to either measure (in the event the invention mechanically autocorrects jitter) or to induce corrective perturbations on the EM beam propagator.

Other devices use materials and structures that act to dampen perturbations (U.S. Pat. No. 7,064,908 B2). Devices of this category do not measure or induce corrective perturbations on an EM beam propagator; instead they dampen (reduce the effect of) perturbations on an EM beam propagator. These devices can be heavy (due to the inherent requirement of using heavy materials such as granite) and large (due to attempting to act as an optical bench or test-bed).

Exemplary embodiments of the invention can be used to correct or nullify perturbations applied to an EM propagator, through active or passive means. Exemplary embodiments do not interact with the propagated EM beam, thereby eliminating deleterious effects incurred by arrays of lenses, mirrors, and crystals in the optical path of the beam outside the enclosure. This is equivalent to increasing the long term efficacy of the device, especially for HELs. Additionally, embodiments allow for flexibility in the materials used and needs only enclose the EM beam propagator making it relatively compact and potentially lightweight. Flexibility of materials is allowed because such a device may be used in the laboratory for experimentation, where a vibration isolation optical bench may be present, or in an alternative environment, where certain properties may be needed from the invention, such as innate vibration dampening.

Exemplary embodiments can measure, induce, and correct perturbations on an EM propagator utilizing pluralities of piezoelectric materials (PMs) and/or piezoelectric transducers (PTs) which are able to convert electrical signals to mechanical forces and vice versa. Consequently, embodiments are excellent devices to perform jitter measurement and study on a HEL system, for example. Additionally, the proposed invention can be used in conjunction with many of the aforementioned patented devices while acting as a perturbation inducer; this can be done by replacing the laser source with a laser source embedded within our invention. A pleasant synergy can be accomplished with vibration isolation systems or platforms.

The invention may also be used in an adaptive optics setting; that is, the apparatus can be used to read and react to perturbations acting on an EM beam propagation system. In this context, a perturbation is applied to a HEL system embedded in the invention. The perturbation is registered by the PTs which are fed into the system controller which can be used to send a counter-signal to the PTs, generating an equivalent force in the opposite direction (counter-action). This effectively dampens the perturbation. Additionally, the ambient perturbations on the device may be recorded, analyzed, and used to form a waveform negating the effects of ambient perturbations in a statistical sense; this could be highly effective in regions with regular oscillatory perturbations (if no regular patterns exist, they can be induced by certain means).

In summary, exemplary embodiments can have similar or better accuracy and fidelity compared to current means of measuring perturbations. Moreover, they can measure, induce, and correct for perturbations, which no other device can. Embodiments can be highly portable due to the minimization of moving parts, low weight, and small size. The minimization of moving parts promotes resistance to regular wear and tear.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
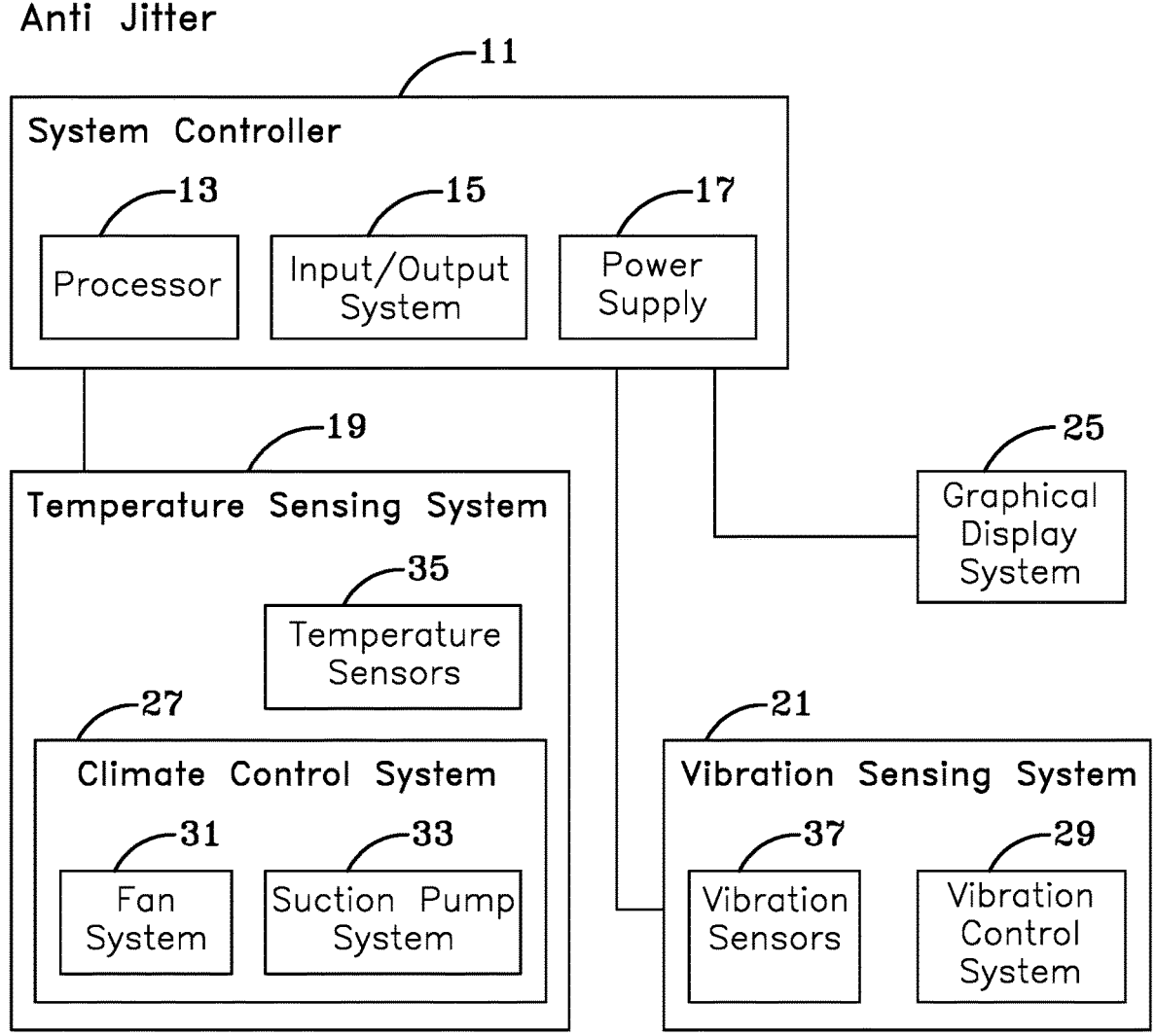
FIG. 1 shows an exemplary system architecture illustrating the connections between the system controller and other system components.

FIG. 1 shows an exemplary system architecture corresponding to an embodiment of the invention including a system controller 11, temperature sensing system 19, force/vibration sensing system 21, and graphical display system (GDS) 25. The system controller includes a processor 13, input/output (I/O) system 15, and power supply 17. The system controller 11 interacts with all other system components, performs calculations, and allows for interaction with outside systems through the I/O system 15. For instance, during operation, a PT can send a data stream to the system controller 11 which can process this data stream (e.g., calculate the level of perturbations applied to an EM source from the environment) and utilize I/O system 15 to interact with a laptop or computer to visualize and record the data. Examples of system controllers can include (PIC) microcontrollers, single-board computers (Raspberry Pi Foundations' Raspberry Pi), and embedded controllers (National Instruments' CompactRIO Controller, see U.S. Pat. No. 6,823,283 and related). Software needed to operate a system controller can be achieved in numerous ways including developed proprietary software pertinent to a microcontroller or National Instruments' LabVIEW (U.S. Pat. No. 5,475,851 and related).

Figure 9:
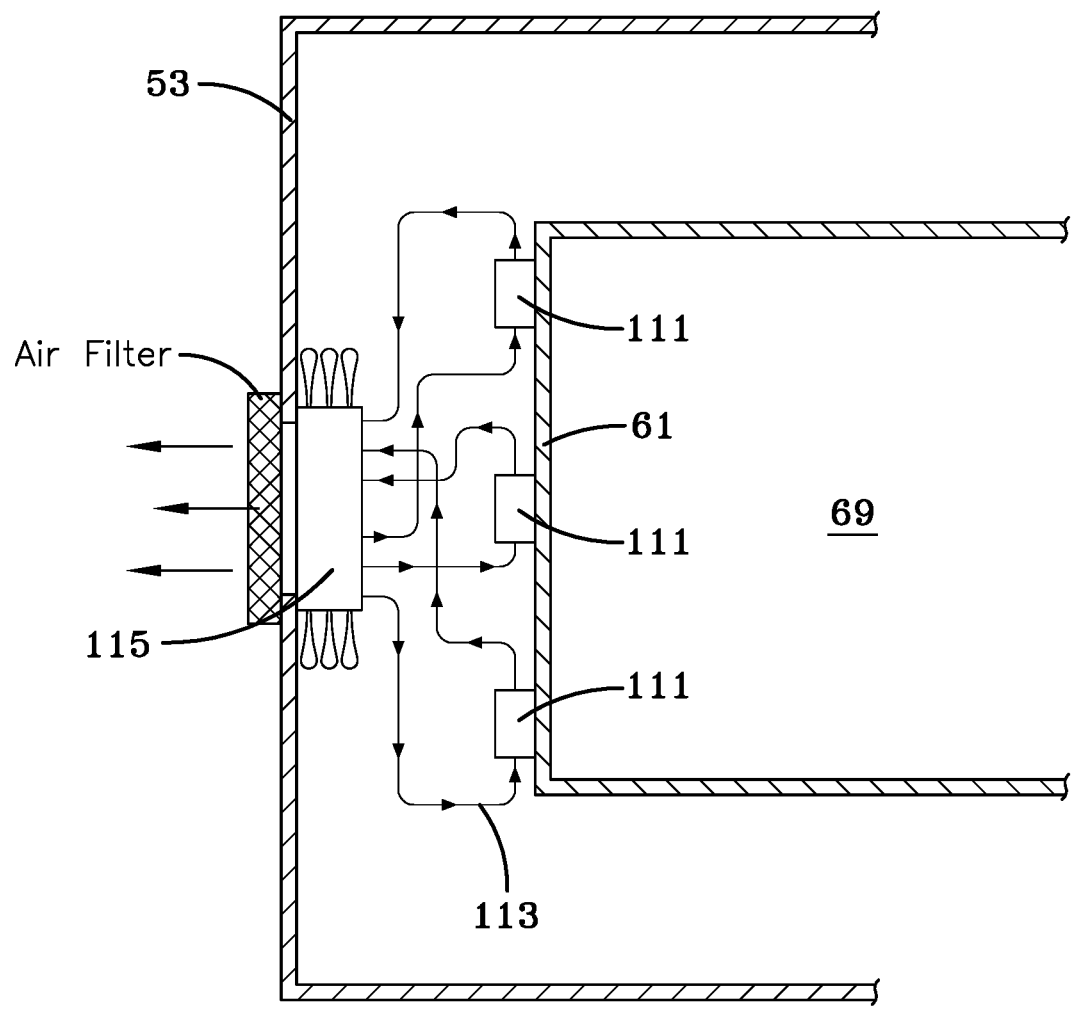
FIG. 9 is a cross-sectional view of an exemplary embodiment of the invention.

A temperature sensing system 19 can include a plurality of temperature sensors 35, such as thermistors or thermocouples, placed at strategic points within the system (e.g., predetermined set intervals throughout a container to ensure local temperatures deviations are accounted for). Sufficiently high temperatures can reduce the fidelity of the perturbation measurement based on the type and quality of the measurement system components. The temperature sensing system 19 can supply a plurality of temperature data to the system controller 11, which, can activate or adjust climate control system 27 to provide a response if a predetermined temperature threshold is met. In an exemplary embodiment, when the temperature sensing system 19 can detect a predetermined temperature on an inner wall of a container, the system controller 11 can transmit a signal to the climate control system 27, which can activate or speed up a fan system 31 (e.g., at least one fan) or a suction pump system (e.g., as shown in FIG. 9, at least one pump connected to at least one fluid circuit) to increase heat extraction from the testing system.

A vibration sensing system 21 can include a plurality of vibration sensors 37, such as PTs, geophones, and accelerometers, placed at strategic points within the system (e.g., predetermined set intervals near an EM source, near the base of a system container). The vibration sensing system 21 can detect perturbations from outside sources (e.g., unstable platforms, vibrations from a building) and from an EM source to generate and relay a plurality of vibration data to the system controller 11. The system controller can then interact with the vibration control system 29 to provide a response depending on application interest. For example, the vibration sensing system 21 can detect perturbations coming from below the invention and, in response, the system controller 11 can send a signal to the vibration control system 29 to initiate a response to dampen the perturbations (e.g., add opposing forces/movements to maintain a near-constant position of system components) to preserve the fidelity of the EM power measurement. The vibration sensing system 21 can also be used to measure and mitigate any vibrations in an EM source created when an EM beam is generated. In at least some embodiments, the system controller 11 can pass a plurality of vibration creation data to the vibration sensing system 21 so that the vibration control system 29 can be used to create vibrations to, for example, simulate movement conditions. In at least some embodiments, the system controller can send a signal to a PT within the vibration sensing system 21 to create a force (e.g., sending an electric current to a PT to vibrate an EM source).

A GDS 25 can receive pluralities of signals from a system controller 11 and display corresponding information (e.g., temperature within the system, vibration, power and frequency recorded by vibration sensing system 21, operational status of the climate control system 27, etc.) on a graphical display unit which can be coupled to an exemplary system or can be a separated by distance (e.g., a computer connected wirelessly or by a cable).

Figure 2:
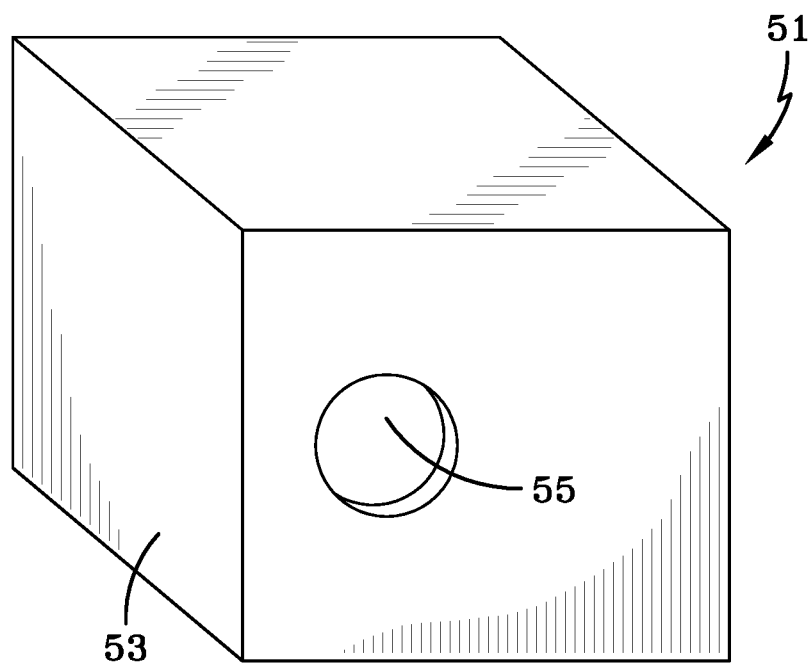
FIG. 2 shows a perspective front view of an exemplary container.

FIG. 2 shows a perspective front view of an exemplary container 51 of a measurement system. The container 51 includes at least one opening 55 for an EM beam to exit. The opening 55 may feature an optical lens (not shown), which can prevent foreign entities (e.g., dust, gas, fingers, etc.) from entering the container. Moreover, the container 51 may be formed in such a way as to be aerodynamic to, for example, reduce perturbations on the system from air currents.

Figure 3:
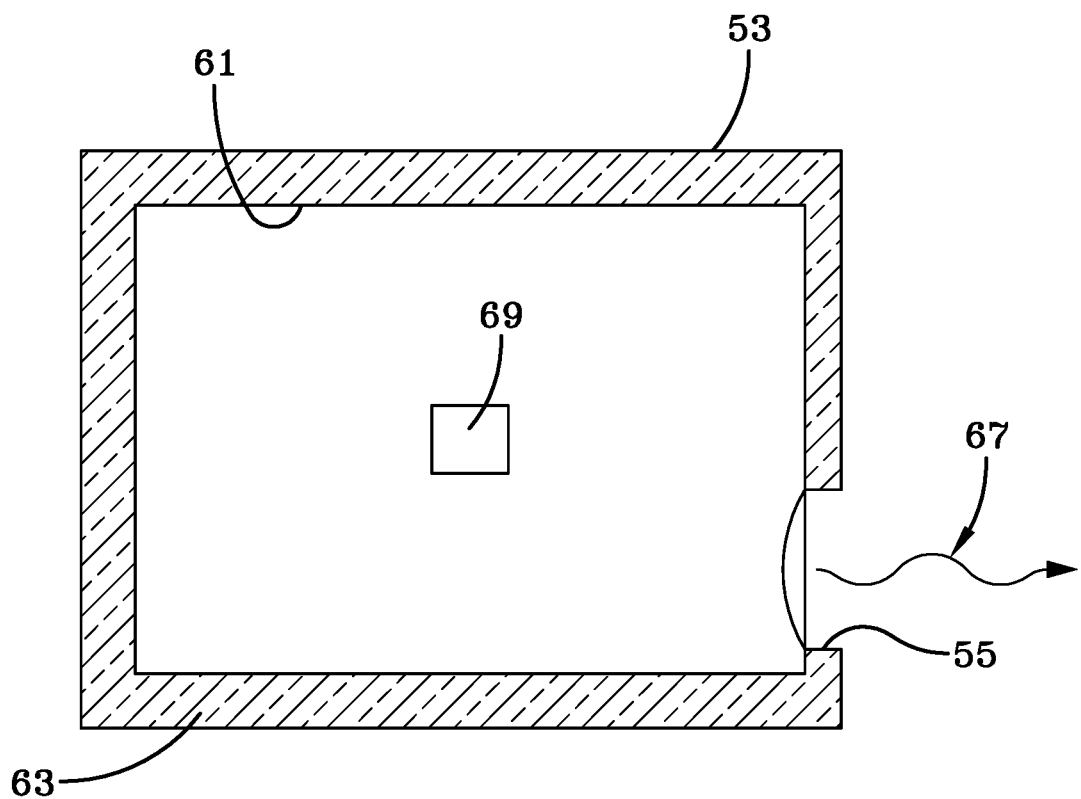
FIG. 3 shows an exemplary cross-sectional top view of the invention.

FIG. 3 shows an exemplary cross-sectional side view of the invention. An EM source 69 can sit within the interior of the outer wall 53, whereby it is able to direct an EM beam 67 outside of the invention. An inner wall 61 can directly contact the surface of the EM source 69 to facilitate temperature control (e.g., removing heat from an EM source 69 through conductive heat transfer) or vibration control (e.g., provide more contact area for vibration stabilization/mitigation). An inner wall 61 can be adjustable through manual or mechanical means to allow an EM source 69 to fit within a container 51 and minimize empty space between the EM source 69 and inner wall 61. Insulation 63 may be featured between the outer wall 53 and the inner wall 61. For example, vibration insulating materials (e.g., polyurethane foam and rubber sponge) can be used for the purpose of reducing the magnitude of environmental perturbations so that vibrations originating from the EM source 69 are more prominent, in comparison. The thermal and vibration insulation materials can passively support the temperature sensing system and vibration control system to prevent heat damage to electronics and other components and prevent unwanted perturbations. Components such as sensors and electronic wiring can be placed within the region separating the two walls protecting both them and other components from possibly deleterious interactions (e.g., an EM source, a kinetic event). In at least some embodiments, the inner wall 61 can be coated with anti-reflective products or materials, such as optical black coatings (e.g., NanoLab's Singularity Black) to minimize absorption of reflected/backscattered EM radiation.

Figure 4:
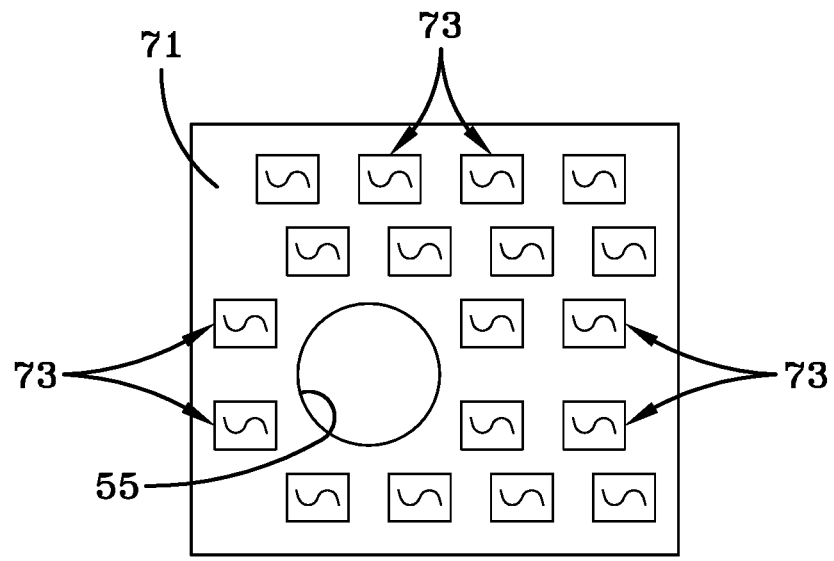
FIG. 4 is an exemplary removable front panel.
Figure 5:
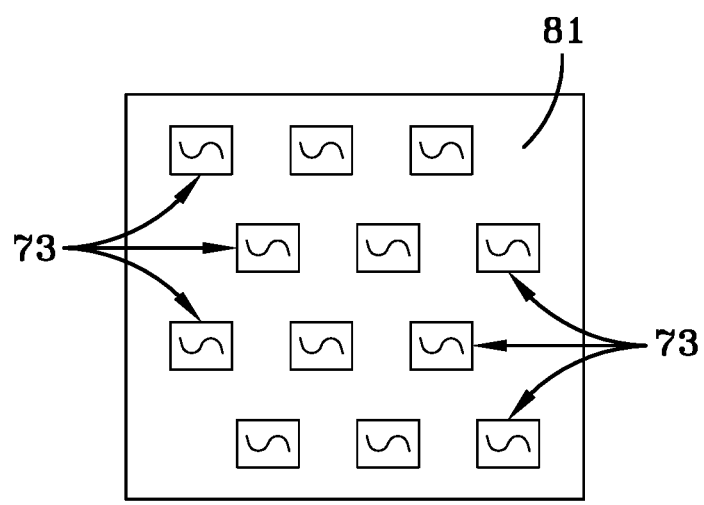
FIG. 5 is an exemplary removable panel.

FIGS. 4 and 5 show an exemplary front panel 71 and an exemplary side panel 81. A front panel 71 includes an opening 55 that allows for an EM beam originating from an EM source 69 to exit the container. The outer wall of a container can be made of a combination of a front panel 71 and at least one side panel 81. A PT 73 can be embedded in each panel which allows for vibration measurement and control of a corresponding side of an EM source. The panels 71 and 81 can be removable allowing for repair, modification, and replacement to occur without having to replace the entire system.

Figure 6:
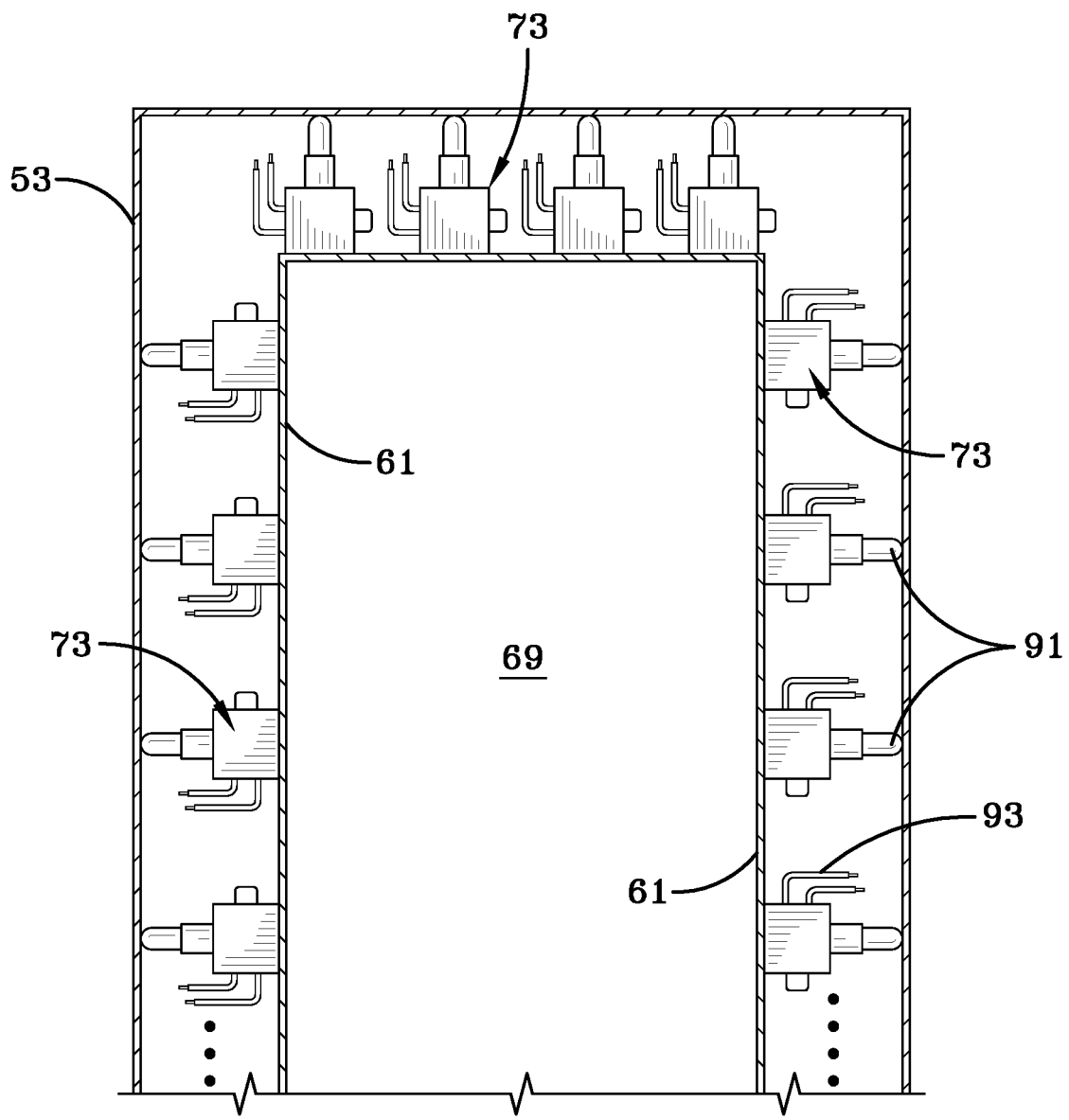
FIG. 6 shows a cross-sectional view of the invention highlighting the interaction between the sensing system and internal structures.

FIG. 6 shows a cross-sectional view of an exemplary embodiment and the interaction between outer wall 53 and inner wall 61 with the PT 73. In this embodiment, wires 93 connected to the PT 73 can exchange electric signals with a system controller. A PT 73 can include adjusters 91, which can extend and contract to allow for pivoting of the inner walls 61 to conform to an EM source within a container. The inner wall 61 can be discontinuous (e.g., having gaps at intersections between sides) to allow for flexibility of movement (e.g., allow expansion and contraction of inner wall 61 without sections of the inner wall 61 colliding). A flexible material (e.g., a folding partition) (not shown) can connect the sides of an inner wall 61 to bridge gaps between the sides. In at least some embodiments, PTs 73 are part of a vibration sensing system (as shown in FIG. 1). In at least some of these embodiments, some PTs 73 can act as vibration sensors (e.g., vibration induces current in PT 73, current allows sensing of vibration) and while other PTs 73 can act as vibration dampeners as part of a vibration control system (e.g., the PT can create reactionary forces such that the net forces acting upon a EM source is zero or near zero in a short time frame to cancel or minimize the motion caused by vibrations).

Figure 7:
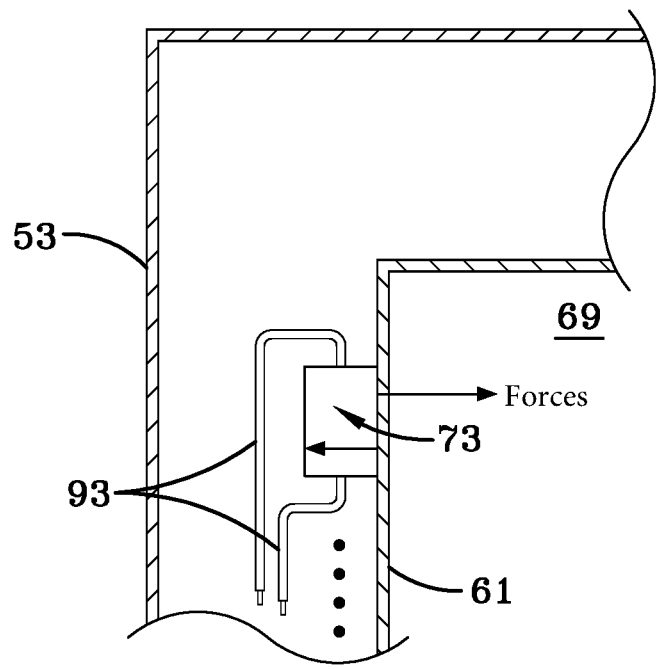
FIG. 7 illustrates the interaction between the EM source and invention.

FIG. 7 illustrates the interaction between the PT 73, inner wall 61 or force platform 131, and EM source 69. In this illustration, the EM source 69 emits a perturbation on the inner wall 61 or force platform 131, which, in turn, transmits a force onto the PT 73. This force induces a current, which is then transmitted through wires 93 to the system controller 11. A calculation can be made which determines the unknown force and thereby the perturbation emitted from the EM source.

Figure 8A:
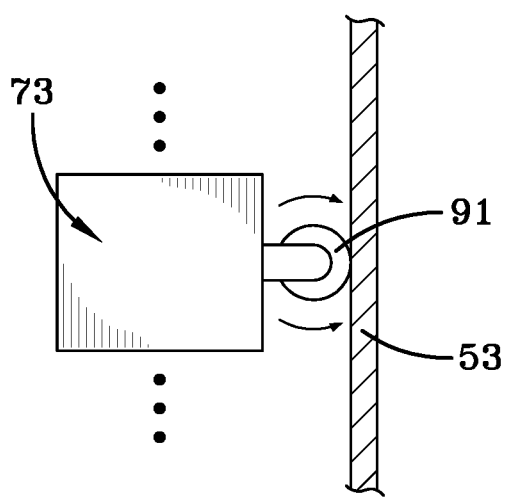
FIGS. 8A and 8B show an exemplary embodiment of a PT.
Figure 8B:
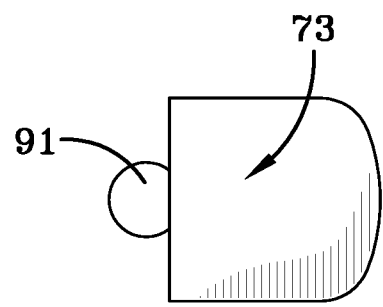

FIGS. 8A and 8B show exemplary embodiments of a PT element 73. The PT 73 features an adjuster 91 in contact with the outer wall 53 such that the PT 73 can rotate to allow for each PT element 73 to come into contact with an EM source of arbitrary shape. FIG. 8B shows a PT 73 with rounded edges, which gives a PT 73 greater flexibility for contacting an EM source.

FIG. 9 illustrates a cross-sectional view of an exemplary embodiment with a cooling system. A water cooling system can be embedded within the region between the inner 61 and outer 53 walls. The water cooling system can include at least one water block 111, tubing 113, and a radiator/pump unit 115. At least one water block 111 can be attached to the inner wall 61 such that heat generated by an EM source can be transferred to the at least one water block 111 through the inner wall 61. Tubing 113 allows for liquid to pass within the water blocks 111, carrying away heat from the at least one water block 111 to the radiator 115. Heat in the radiation can exit the testing system through a conductive heat sink (not shown) or through convective cooling across the outer wall 53. The water cooling system can allow for heat to be wicked away from the interior region of the outer wall 53, hosting the EM source 69, to the outside environment.

Figure 10B:
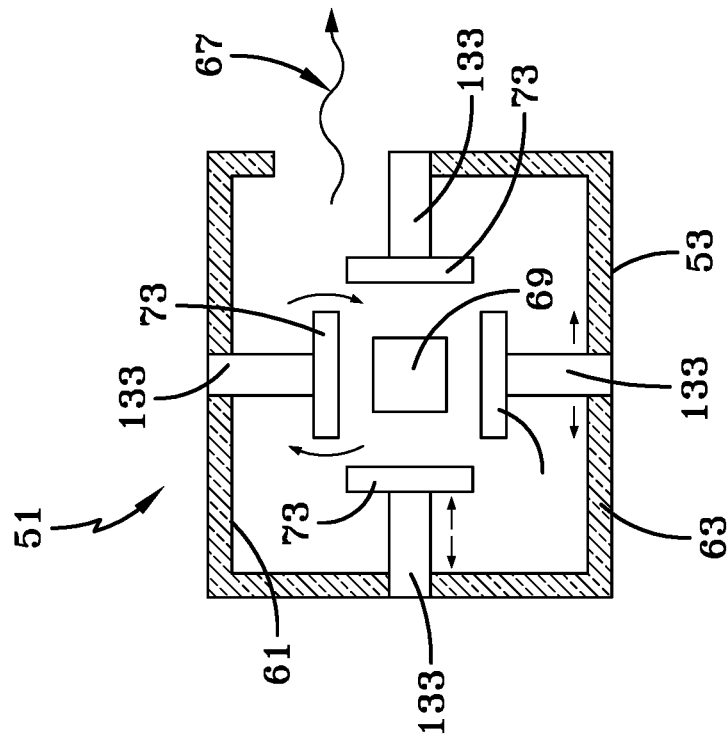
FIG. 10B shows an exemplary clamping system in extended form.
Figure 10A:
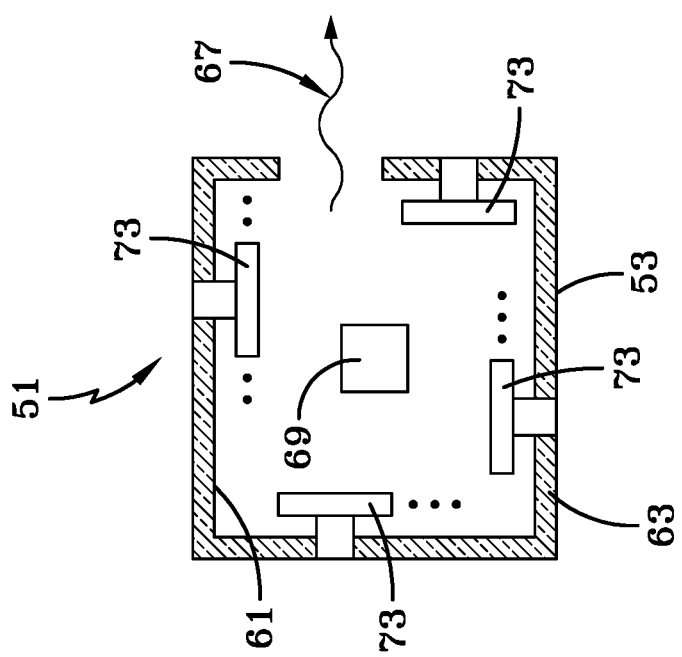
FIG. 10A shows an exemplary clamping system.

FIGS. 10A and 10B show a cross-sectional view of an exemplary embodiment of the invention featuring a clamping system in non-extended and extended forms. A plurality of force platforms 131 can maintain contact with an EM source 69 to hold the EM source 69 in place and to transfer heat away from the EM source 69. Each of the force platforms 131 is connected to a force member 133. Each force member 133 is connected to a force platform 131 on a first end and a container 51 on a second end. Each force platform 131 can be rounded (e.g., a semi-circle, wherein the rounded portion contacts an EM source 69) to allow maintained contact for various angles and EM source 69 angles or flat to maximize surface area in contact with an EM source 69. A force platform 131 can be primarily made of a PT or can include a significant portion of other materials (e.g., metals, ceramics). Higher proportions of PT material within a force platform 131 will allow increased reduction and measurement of vibrations caused by an EM source 69 but will decrease reduction and measurement of vibrations caused by environmental sources (e.g., seismic vibrations). In at least some embodiments, force member 133 can be adjusted to extend and contract the corresponding force platform 131 to allow the force platforms to contact varying sizes and shapes of an EM source 69. In alternative embodiments, there can be no PT within the force platform; instead, a PT can be placed between each force member 133 and the container 51 such that a force platform 131 can transmit a perturbation, originating from an EM source 69, to a force member 133, which, in turn, transmits the perturbation to the PT 73, from which a calculation can be made regarding the magnitude of the perturbation. The number of force platforms can be varied to accommodate different EM sources 69 depending on the shape of the EM source 69 (using four force platforms 131 per side of the container 51). The force platforms 131 may be able to move with a motorized or manual mechanical system both at the interface between the force platforms 131 and the EM source 69 and at the interface between the container 51 or inner wall 61 and the force member 133 or a PT.

Although the invention has been described in detail with reference to certain preferred embodiments, variations and modifications exist within the spirit and scope of the invention as described and defined in the following claims.

The invention claimed is:

1. A system for housing electromagnetic (EM) sources comprising:

a container comprising an interior wall section, an exterior wall section, and an aperture wall section, wherein the interior wall section forms a first cavity section within the container, wherein the exterior wall section forms an exterior surface of the container, wherein the aperture wall section forms an aperture between the interior and exterior wall sections connecting the first cavity section to the exterior surface on a first side of the container, wherein the interior and exterior wall sections form a second cavity section between the interior and exterior wall sections;
a vibration sensing system comprising:
a plurality of piezoelectric transducers (PTs) each comprising a piezoelectric material (PM) and an adjuster, wherein the plurality of PTs is disposed within the second cavity section such that each PM contacts the interior wall section and each adjuster contacts the exterior wall section, wherein extending the adjusters of the plurality of PTs moves the interior wall section such that the volume of the first cavity section decreases; and
a system controller, wherein the system controller is electrically coupled to the vibration sensing system;
wherein the system controller is configured to activate the plurality of PTs after an EM source is placed within the first cavity such that at least one adjuster of the plurality PTs extends to move the interior wall section so that the interior wall section is flush with the EM source;
wherein vibrations cause at least one first force to act upon at least one PM of the plurality of PTs, wherein each PM receiving the at least one first force generates at least one first electrical signal in response to the received at least one first force, wherein the system controller is configured to receive and process the at least one first electrical signal from each PM;
wherein the system controller is configured to generate at least one second electrical signal and transfer the at least one second electrical signal to at least one PM of the plurality of PTs, wherein the at least one PM of the plurality of PTs generates at least one second force in response to the received at least one second electrical signal, wherein the at least one second force acts upon the interior wall section to counteract the vibrations.

2. The system for housing electromagnetic (EM) sources of claim 1, further comprising the EM source.

3. The system for housing electromagnetic (EM) sources of claim 1, further comprising:
a temperature sensing system comprising:
at least one temperature sensor;
a climate control system comprising:
at least one fan coupled to the exterior wall section; and
a pump system comprising:
at least one pump coupled to the exterior wall section;
a plurality of water blocks coupled to the interior wall section; and
a plurality of flexible tubes coupled to the pump;
wherein the pump is configured to pump a coolant through the plurality of tubes and the plurality of water blocks;
wherein the system controller is electrically coupled to the temperature sensing system.

4. The system for housing electromagnetic (EM) sources of claim 1, the interior wall section comprising a plurality of removable interior wall panels, the exterior wall section comprising a plurality of removable exterior wall panels.

5. The system for housing electromagnetic (EM) sources of claim 4, wherein the plurality of PTs are coupled to the exterior wall panels.

6. The system for housing electromagnetic (EM) sources of claim 1, further comprising a graphical display system electrically coupled to the system controller, wherein the system controller is configured to convert the at least one electrical signal into at least one first measurement reading signal, wherein the system controller transfers the at least one first measurement reading signal to the graphical display system, wherein the graphical display system is configured to display a graphical representation of the measurements of the at least one force.

7. The system for housing electromagnetic (EM) sources of claim 1, wherein the system controller is configured to generate at least one third electrical signal and transfer the at least one third electrical signal to at least one PM of the plurality of PTs, wherein the at least one PM of the plurality of PTs generates at least one third force in response to the received at least one third electrical signal, wherein the at least one third force acts upon the interior wall section to create vibrations of a predetermined magnitude.

8. A system for housing electromagnetic (EM) sources comprising:
a container comprising an interior wall section, an exterior wall section, and an aperture wall section, wherein the interior wall section forms a first cavity section within the container, wherein the exterior wall section forms an exterior surface of the container, wherein the aperture wall section forms an aperture between the interior and exterior wall sections connecting the first cavity section to the exterior surface on a first side of the container, wherein the interior and exterior wall sections form a second cavity section between the interior and exterior wall sections;
a vibration sensing system comprising:
a plurality of piezoelectric transducers (PTs) each comprising a piezoelectric material (PM) and an adjuster, wherein the plurality of PTs is disposed within the second cavity section such that each PM contacts the interior wall section and each adjuster contacts the exterior wall section, wherein extending the adjusters of the plurality of PTs moves the interior wall section such that the volume of the first cavity section decreases;
a system controller, wherein the system controller is electrically coupled to the vibration sensing system;
an EM source;
a temperature sensing system comprising:
at least one temperature sensor;
a climate control system comprising:
at least one fan coupled to the exterior wall section; and
a pump system comprising:
at least one pump coupled to the exterior wall section;
a plurality of water blocks coupled to the interior wall section; and
a plurality of flexible tubes coupled to the pump;
wherein the pump is configured to pump a coolant through the plurality of tubes and the plurality of water blocks; and
a graphical display system electrically coupled to the system controller, wherein the system controller is configured to convert the at least one electrical signal into at least one first measurement reading signal, wherein the system controller transfers the at least one first measurement reading signal to the graphical display system, wherein the graphical display system is configured to display a graphical representation of the measurements of the at least one force;
wherein the system controller is electrically coupled to the temperature sensing system;
wherein the system controller is configured to activate the plurality of PTs after the EM source is placed within the first cavity such that at least one adjuster of the plurality PTs extends to move the interior wall section so that the interior wall section touches the EM source;

wherein vibrations cause at least one first force to act upon at least one PM of the plurality of PTs, wherein each PM receiving the at least one first force generates at least one first electrical signal in response to the received at least one first force, wherein the system controller is configured to receive and process the at least one first electrical signal from each PM;

wherein the system controller is configured to generate at least one second electrical signal and transfer the at least one second electrical signal to at least one PM of the plurality of PTs, wherein the at least one PM of the plurality of PTs generates at least one second force in response to the received at least one second electrical signal, wherein the at least one second force acts upon the interior wall section to counteract the vibrations;

wherein the interior wall section comprises a plurality of removable interior wall panels, the exterior wall section comprises a plurality of removable exterior wall panels, wherein the plurality of PTs are coupled to the exterior wall panels.

9. A system for housing electromagnetic (EM) sources comprising:

a container comprising an exterior wall section and an aperture wall section, wherein the exterior wall section forms a first cavity section within the container, wherein the exterior wall section forms an exterior surface of the container, wherein the aperture wall section forms an aperture connecting the first cavity section to the exterior surface on a first side of the container;

a vibration sensing system comprising:
a plurality of piezoelectric transducers (PTs) each comprising a piezoelectric material (PM) and an adjuster, wherein the plurality of PTs is disposed within the first cavity section such that each adjuster contacts the exterior wall section, wherein extending the adjusters of the plurality of PTs moves the PTs towards a center of the first cavity section; and a system controller, wherein the system controller is electrically coupled to the vibration sensing system;

wherein the system controller is configured to activate the plurality of PTs after an EM source is placed within the first cavity such that at least one adjuster of the plurality PTs extends until the corresponding PM touches the EM source;

wherein vibrations cause at least one first force to act upon at least one PM of the plurality of PTs, wherein each PM receiving the at least one first force generates at least one first electrical signal in response to the received at least one first force, wherein the system controller is configured to receive and process the at least one first electrical signal from each PM;

wherein the system controller is configured to generate at least one second electrical signal and transfer the at least one second electrical signal to at least one PM of the plurality of PTs, wherein the at least one PM of the plurality of PTs generates at least one second force in response to the received at least one second electrical signal, wherein the at least one second force acts upon the EM source to counteract the vibrations.

10. The system for housing electromagnetic (EM) sources of claim 9, further comprising the EM source.

11. The system for housing electromagnetic (EM) sources of claim 9, the exterior wall section comprising a plurality of removable exterior wall panels.

12. The system for housing electromagnetic (EM) sources of claim 11, wherein the plurality of PTs are coupled to the exterior wall panels.

13. The system for housing electromagnetic (EM) sources of claim 9, further comprising a graphical display system electrically coupled to the system controller, wherein the system controller is configured to convert the at least one electrical signal into at least one first measurement reading signal, wherein the system controller transfers the at least one first measurement reading signal to the graphical display system, wherein the graphical display system is configured to display a graphical representation of the measurements of the at least one force.

14. The system for housing electromagnetic (EM) sources of claim 9, wherein the system controller is configured to generate at least one third electrical signal and transfer the at least one third electrical signal to at least one PM of the plurality of PTs, wherein the at least one PM of the plurality of PTs generates at least one third force in response to the received at least one third electrical signal, wherein the at least one third force acts upon the EM source to create vibrations of a predetermined magnitude.

* * * * *